US011912546B2

(12) United States Patent
Kim et al.

(10) Patent No.: US 11,912,546 B2
(45) Date of Patent: Feb. 27, 2024

(54) LOAD LIFTING TENSIONED INFLATABLE STRUCTURE

(71) Applicants: GM Global Technology Operations LLC, Detroit, MI (US); Regents of the University of Michigan, Ann Arbor, MI (US)

(72) Inventors: Wonhee Michael Kim, Royal Oak, MI (US); Paul W. Alexander, Ypsilanti, MI (US); Yun Ju Kim, Yongin-Si (KR); Diann Brei, Milford, MI (US); Koray Benli, Ann Arbor, MI (US); Jonathan E. Luntz, Ann Arbor, MI (US); Laura Alejandra Giner Munoz, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 17/825,213

(22) Filed: May 26, 2022

(65) Prior Publication Data

US 2023/0382697 A1 Nov. 30, 2023

(51) Int. Cl.
*B66F 3/35* (2006.01)
*B66F 3/36* (2006.01)

(52) U.S. Cl.
CPC . *B66F 3/36* (2013.01); *B66F 3/35* (2013.01)

(58) Field of Classification Search
CPC .................................... B66F 3/35; B66F 3/36
See application file for complete search history.

(56) References Cited

U.S. PATENT DOCUMENTS 4,762,298 A * 8/1988 Wood .................. F16M 11/126 52/2.25
7,926,787 B2 * 4/2011 Wieland .................... B66F 3/35 254/93 HP

* cited by examiner

*Primary Examiner* — Lee D Wilson
(74) *Attorney, Agent, or Firm* — Vivacqua Crane, PLLC

(57) ABSTRACT

An inflatable structure includes a top end cap, a bottom end cap, a bladder attached to the top and bottom end caps and configured to hold pressurized air, a plurality of tethers disposed within the bladder, the inflatable structure moveable between a stowed profile and a final support profile, wherein the bladder is pressurized and expanded axially and the plurality of tethers are fully extended and restrict further movement of the top end cap and the bottom end cap away from one another and limit axial expansion of the bladder, a pulley assembly mounted within the bottom end cap, wherein in the stowed support profile, the plurality of tethers are wound onto the pulley assembly, the pulley assembly adapted to allow selective extension of the tethers allowing axial expansion of the bladder, wherein, the inflatable structure is adapted to provide multiple intermediary support profiles capable of supporting compressive loading.

20 Claims, 5 Drawing Sheets

LOAD LIFTING TENSIONED INFLATABLE STRUCTURE

INTRODUCTION

The present disclosure relates to a load lifting inflatable structure that provides multiple support profiles.

Internally tensioned inflatable structures typically include a bladder that holds pressurized air and tethers that are attached to opposite internal surfaces of the bladder. As the bladder is inflated, the pressure within the bladder causes the bladder to expand outward and thereby, ultimately applies tension to the tethers, which in turn limits expansion of the bladder. In addition to limiting expansion of the bladder, the tethers increase the amount of compressive load that the bladder may withstand before the bladder deforms due to the compressive load.

In known inflatable structures, when the bladder is not inflated, there is no tension on the tethers and the tethers are slack. When pressure is applied within the bladder, the bladder begins to expand. The bladder does not need to overcome any resistance to expansion, and any pressure above atmospheric will cause the bladder to expand. Because there is no resistance to expansion, the pressure within the bladder does not increase substantially until the bladder is fully inflated. Thus, the bladder is incapable of supporting any significant load until the bladder is fully expanded. Once the bladder is fully expanded, and the tethers are tensioned, pressure can build up within the bladder such that the bladder is capable of supporting load. The higher the pressure within the bladder, the more compressive loading the bladder is capable of supporting before the bladder deforms due to the compressive load.

Thus, while current inflatable structures achieve their intended purpose, there is a need for a new and improved inflatable structure that includes in-elastic tethers that are adapted to be incrementally lengthened as the bladder expands, thereby allowing pressure build-up within the bladder throughout expansion such that the inflatable structure provides multiple support profiles that are capable of supporting compressive loads.

SUMMARY

According to several aspects of the present disclosure, an inflatable structure includes a top end cap, a bottom end cap, a bladder attached to the top and bottom end caps and configured to hold pressurized air between the top and bottom end caps, and a plurality of tethers disposed within the bladder, each tether in the plurality of tethers having a first end coupled to the top end cap and a second end coupled to the bottom end cap, the inflatable structure moveable between a stowed profile, wherein no pressure is present within the bladder and the top end cap and bottom end cap are positioned in contact and the bladder is compressed within the top end cap and the bottom end cap, and a final support profile, wherein the bladder is pressurized and expanded axially and the top end cap and the bottom end cap are forced apart and the plurality of tethers are fully extended and restrict further movement of the top end cap and the bottom end cap away from one another and limit axial expansion of the bladder, and a pulley assembly mounted within the bottom end cap, wherein when the inflatable structure is in the stowed support profile, the plurality of tethers are wound onto the pulley assembly, the pulley assembly adapted to allow selective extension of the plurality of tethers to increase the distance that the top end cap can move away from the bottom end cap and allowing axial expansion of the bladder, wherein, the inflatable structure is adapted to provide multiple intermediary support profiles between the stowed profile and the final support profile that are capable of supporting compressive loading.

According to another aspect, the pulley assembly is adapted to secure the plurality of tethers at each intermediary support profile and limit further extension of the plurality of tethers.

According to another aspect, the pulley assembly includes an escapement mechanism adapted to prevent rotation of the pulley assembly, and preventing the plurality of tethers from un-winding from the pulley assembly.

According to another aspect, the escapement mechanism includes a release lever that is adapted to allow selective incremental release of the pulley assembly, thereby allowing the pulley assembly to un-wind and release a measured length of each of the plurality of tethers.

According to another aspect, the bottom end cap includes an upper surface onto which the bladder is attached, and a bottom surface, the pulley assembly being positioned adjacent the upper surface and the escapement mechanism being positioned adjacent the bottom surface.

According to another aspect, the bottom end cap includes a plurality of loops extending from the upper surface of the bottom end cap and equally spaced circumferentially around the bottom end cap adjacent an outer perimeter of the bottom end cap, each of the plurality of tethers adapted to extend from the pulley assembly and through one of the plurality of loops and upward to the top end cap.

According to another aspect, the bottom end cap includes an air inlet adapted to allow pressurized air to be routed into the inflatable structure.

According to another aspect, the escapement mechanism includes a gear including a plurality of gear teeth mounted in rotational engagement with the pulley assembly and adapted to rotate with the pulley assembly, and the release lever includes an anchor portion pivotally mounted to the bottom end cap adjacent the gear, the anchor portion of the release lever adapted to engage the plurality of teeth and prevent rotation of the gear and pulley assembly and unwinding of the plurality of tethers and adapted to be selectively actuated, wherein each actuation of the anchor portion of the release lever allows the gear to rotate one tooth which allows a measured length of each of the plurality of tethers to unwind from the pulley assembly.

According to another aspect, the pulley assembly includes a single pulley, each of the plurality of tethers adapted to wind up onto the single pulley, wherein each actuation of the anchor portion of the release lever allows an equal length of each of the plurality of tethers to unwind from the pulley.

According to another aspect, the pulley assembly includes at least two pulleys, at least one of the plurality of tethers adapted to wind onto each of the at least two pulleys, wherein each of the at least two pulleys is adapted to allow selective incremental release of a different measured length of the at least one of the plurality of tethers wound thereon upon each actuation of the release lever.

According to another aspect, the pulley assembly includes a first pulley and a second pulley, at least one of the plurality of tethers adapted to wind onto each of the at least two pulleys, and the escapement mechanism includes a gear set including a first gear, a second gear and a third gear, each of the first, second and third gears having a plurality of gear teeth, the first pulley rotatably attached to the first gear, the second pulley rotatably attached to the second gear, and the third gear engaged with and interconnecting the first and second gears, wherein, the release lever includes an anchor portion pivotally mounted to the bottom end cap adjacent to and engaging the third gear to prevent rotation of the first, second and third gears and the first and second pulleys and un-winding of the plurality of tethers from the first and second pulleys and adapted to be selectively actuated, wherein each actuation of the anchor portion of the release lever allows the first, second and third gears to rotate one gear tooth which allows a different measured length of the at least one of the plurality of tethers wound thereon to unwind from each of the first and second pulleys.

According to another aspect, the first gear includes a first number of gear teeth, and the second gear includes a second number of gear teeth greater than the first number of gear teeth.

According to another aspect, the inflatable structure is mounted within an automotive vehicle and when in the stowed position, the inflatable structure is recessed flush with a floor of the vehicle and is adapted to provide one of a seating surface, a table and a cargo constraint when in the final support profile and any one of the plurality of intermediary support profiles.

According to several aspects of the present disclosure, an inflatable structure includes a top end cap, a bottom end cap, a bladder attached to the top and bottom end caps and configured to hold pressurized air between the top and bottom end caps, a first tether, a second tether, a third tether and a fourth tether disposed within the bladder, the first, second, third and fourth tethers each having a first end coupled to the top end cap and a second end coupled to the bottom end cap, the inflatable structure moveable between a stowed profile, wherein no pressure is present within the bladder and the top end cap and bottom end cap are positioned in contact and the bladder is compressed within the top end cap and the bottom end cap, and a final support profile, wherein the bladder is pressurized and expanded axially and the top end cap and the bottom end cap are forced apart and the first, second, third and fourth tethers are fully extended and restrict further movement of the top end cap and the bottom end cap away from one another and limit axial expansion of the bladder, and a pulley assembly mounted within the bottom end cap, wherein when the inflatable structure is in the stowed profile, each of the first, second, third and fourth tethers are wound onto the pulley assembly, the pulley assembly adapted to allow selective extension of each of the first, second, third and fourth tethers to increase the distance that the top end cap can move away from the bottom end cap and allowing axial expansion of the bladder, wherein, the inflatable structure is adapted to provide multiple intermediary support profiles between the stowed profile and the final support profile that are capable of supporting compressive loading, and when in the stowed position, the inflatable structure is recessed flush with a floor of the vehicle and is adapted to provide one of a seating surface, a table and a cargo constraint when in the final support profile and any one of the plurality of intermediary support profiles.

According to another aspect, the pulley assembly includes an escapement mechanism adapted to prevent rotation of the pulley assembly and prevent the plurality of tethers from un-winding from the pulley assembly to secure the plurality of tethers and limit further extension of the plurality of tethers at each intermediary support profile, the escapement mechanism including a release lever that is adapted to allow selective incremental release of the pulley assembly, thereby allowing the pulley assembly to un-wind and release a measured length of each of the plurality of tethers.

According to another aspect, the bottom end cap includes an upper surface onto which the bladder is attached, and a bottom surface, the pulley assembly being positioned adjacent the upper surface and the escapement mechanism being positioned adjacent the bottom surface, an air inlet adapted to allow pressurized air to be routed into the inflatable structure, and four loops extending from the upper surface of the bottom end cap and equally spaced circumferentially around the bottom end cap adjacent an outer perimeter of the bottom end cap, each of the first, second, third and fourth tethers extending from the pulley assembly and individually through one of the four loops and upward to the top end cap.

According to another aspect, the escapement mechanism includes a gear including a plurality of gear teeth mounted in rotational engagement with the pulley assembly and adapted to rotate with the pulley assembly, and the release lever includes an anchor portion pivotally mounted to the bottom end cap adjacent the gear, the anchor portion of the release lever adapted to engage the plurality of teeth and prevent rotation of the gear and pulley assembly and un-winding of the plurality of tethers and adapted to be selectively actuated, wherein each actuation of the anchor portion of the release lever allows the gear to rotate one tooth which allows a measured length of each of the plurality of tethers to unwind from the pulley assembly.

According to another aspect, the pulley assembly includes a single pulley, each of the plurality of tethers adapted to wind up onto the single pulley, wherein each actuation of the anchor portion of the release lever allows an equal length of each of the plurality of tethers to unwind from the pulley.

According to another aspect, the pulley assembly includes a first pulley and a second pulley, at least one of the plurality of tethers adapted to wind onto each of the at least two pulleys, and the escapement mechanism includes a gear set including a first gear, a second gear and a third gear, each of the first, second and third gears having a plurality of gear teeth, the first pulley rotatably attached to the first gear, the second pulley rotatably attached to the second gear, and the third gear engaged with and interconnecting the first and second gears, wherein, the release lever includes an anchor portion pivotally mounted to the bottom end cap adjacent to and engaging the third gear to prevent rotation of the first, second and third gears and the first and second pulleys and un-winding of the plurality of tethers from the first and second pulleys and adapted to be selectively actuated, wherein each actuation of the anchor portion of the release lever allows the first, second and third gears to rotate one gear tooth which allows a different measured length of the at least one of the plurality of tethers wound thereon to unwind from each of the first and second pulleys.

According to another aspect, the first gear includes a first number of gear teeth, and the second gear includes a second number of gear teeth greater than the first number of gear teeth.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
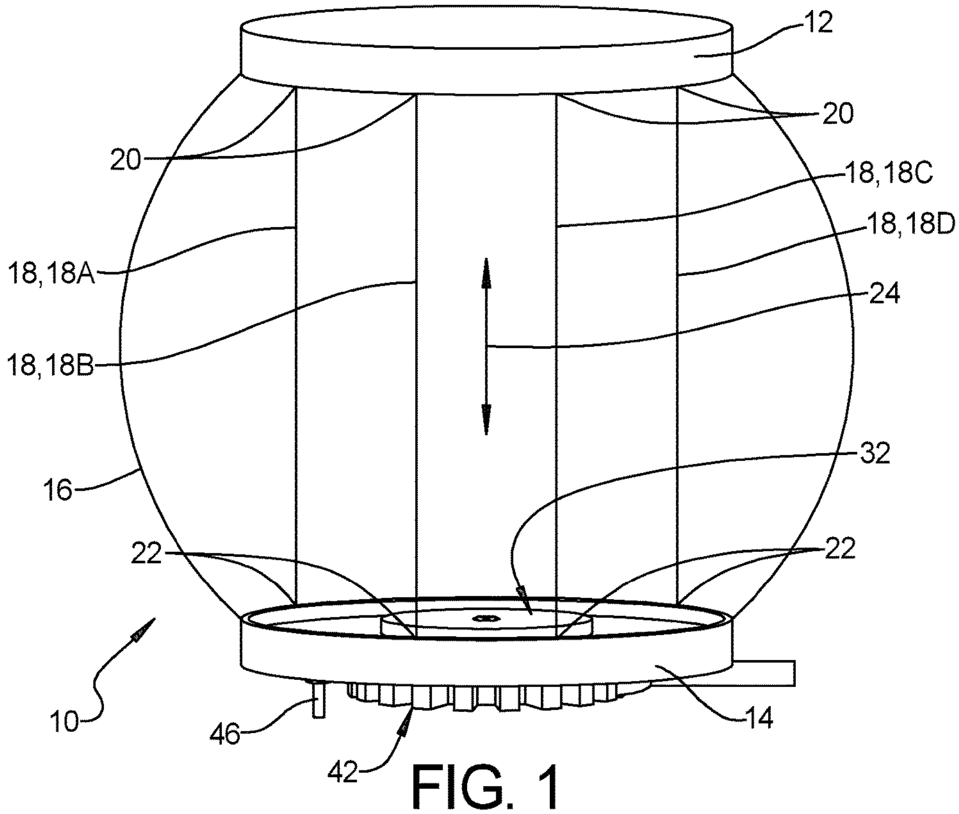
FIG. 1 is a schematic view of an inflatable structure in accordance with an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, an inflatable structure 10 in accordance with the present disclosure includes a top end cap 12, a bottom end cap 14, a bladder 16 attached to the top and bottom end caps 12, 14 and configured to hold pressurized air between the top and bottom end caps 12, 14, and a plurality of tethers 18 disposed within the bladder 16. Each tether 18 in the plurality of tethers 18 has a first end 20 coupled to the top end cap 12 and a second end 22 coupled to the bottom end cap 14. When the bladder 16 is inflated, the bladder 16 expands axially, as indicated by arrow 24, forcing the top end cap 12 and the bottom end cap 14 away from one another. The plurality of tethers 18 are adapted to restrict movement of the top end cap 12 and the bottom end cap 14 away from one another and limit axial expansion of the bladder 16. The inflatable structure 10 is adapted to provide multiple support profiles that are capable of supporting compressive loading.

Figures 2A, 2B, 2C:
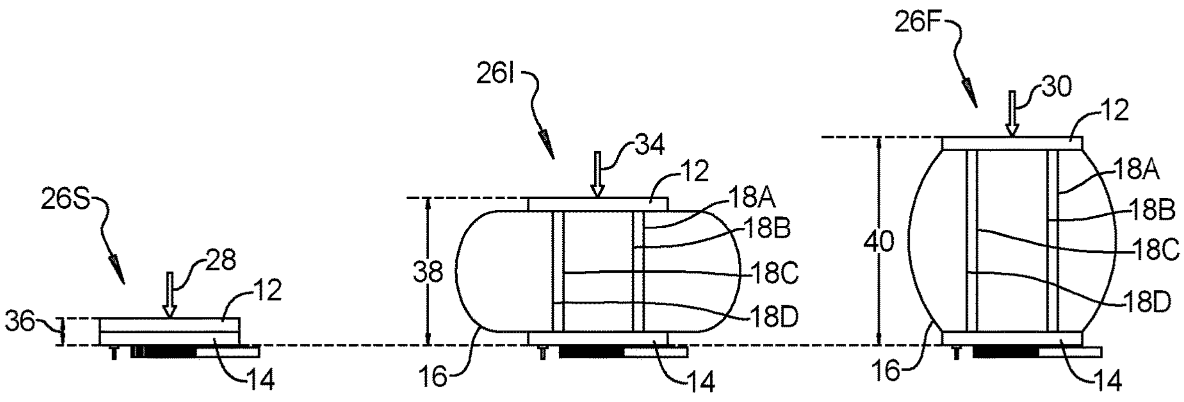
FIG. 2A is a schematic view of the inflatable structure shown in FIG. 1, wherein the inflatable structure is in a stowed support profile.
FIG. 2B is a schematic view of the inflatable structure shown in FIG. 1, wherein the inflatable structure is in an intermediary support structure.
FIG. 2C is a schematic view of the inflatable structure shown in FIG. 1, wherein the inflatable structure is in a final support structure.

Referring to FIG. 2A, FIG. 2B and FIG. 2C, the inflatable structure 10 is moveable between a stowed support profile 26S, as shown in FIG. 2A, and a final support profile 26F, as shown in FIG. 2C. In the stowed support profile 26S, no pressure is present within the bladder 16 and the top end cap 12 and bottom end cap 14 are positioned in contact and the bladder 16 is compressed within the top end cap 12 and the bottom end cap 14, and the inflatable support structure 10 can support a compressive load, as indicated by arrow 28. In the final support profile 26F, the bladder 16 is pressurized and expanded axially and the top end cap 12 and the bottom end cap 14 are forced apart and the plurality of tethers 18 are fully extended and restrict further movement of the top end cap 12 and the bottom end cap 14 away from one another and limit axial expansion of the bladder 16. Because the tethers 18 are not able to extend further, expansion of the bladder 16 pulls the tethers 18 tight, and pressure is allowed to build up within the bladder 16, wherein the inflatable structure 10 is able to support a compressive load, as indicated by arrow 30.

In an exemplary embodiment, the inflatable structure 10 includes a first tether 18A, a second tether 18B, a third tether 18C and a fourth tether 18D disposed within the bladder 16. Each of the first, second, third and fourth tethers 18A, 18B, 18C, 18D having a first end 20 coupled to the top end cap 12 and a second end 22 coupled to the bottom end cap 14.

Figure 3:
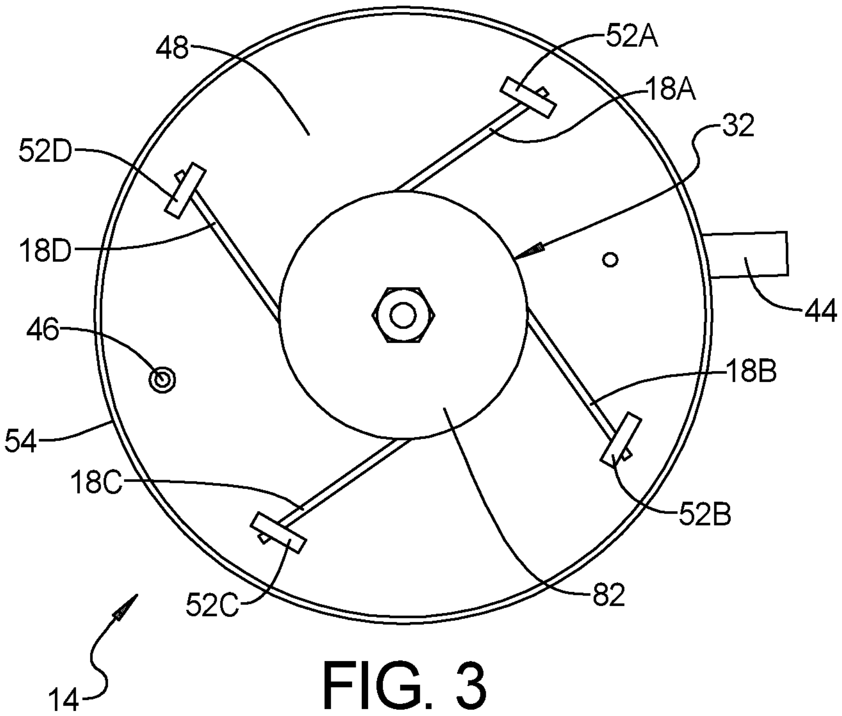
FIG. 3 is a view looking down onto an upper surface of a bottom end cap.

Referring to FIG. 3, a pulley assembly 32 is mounted within the bottom end cap 14, wherein when the inflatable structure 10 is in the stowed profile 26S, the plurality of tethers 18A, 18B, 18C, 18D are wound onto the pulley assembly 32. The pulley assembly 32 is adapted to allow selective extension of the plurality of tethers 18A, 18B, 18C, 18D to increase the distance that the top end cap 12 can move away from the bottom end cap 14 and allowing axial expansion of the bladder 16. The inflatable structure 10 is adapted to provide multiple intermediary support profiles 261 between the stowed profile 26S and the final support profile 26F that are capable of supporting compressive loading.

Referring to FIG. 2B, the inflatable structure 10 is shown in an intermediary support profile 261, wherein the bladder 16 is not fully expanded, but the pulley assembly 32 prevents further extension of the tethers 18A, 18B, 18C, 18D. Because the tethers 18A, 18B, 18C, 18D restrict further expansion of the bladder 16 and movement of the top end cap 12 away from the bottom end cap 14, pressure builds up within the bladder 16 and the inflatable structure 10 is capable of supporting a compressive load in the intermediary support profile 261, as indicated by arrow 34. Referring again to FIG. 2A, the inflatable structure 10 has a stowed height 36 when in the stowed support profile 26S, an intermediary height 38 when in the intermediary support profile 261, and a final height 40 when in the final support profile 26F. Because the pulley system is adapted to allow selective extension of the tethers 18A, 18B, 18C, 18D, a person using the inflatable structure can release as much or as little of the tethers 18A, 18B, 18C, 18D as desired. Thus, the inflatable support structure is capable of providing multiple intermediary support profiles 261 of various heights between the stowed height 36 and the final height 40, any one of the intermediary support profiles 261 is able to support a compressive load.

In the inflatable structure 10 described herein, it is assumed that the bottom end cap 14 is stationary or fixed in space, and movement of the top end cap 12 is only constrained by the tethers 18 that connect the top and bottom end caps 12, 14 to one another. However, in various implementations, the top end cap 12 may be stationary or fixed in space, and movement of the bottom end cap 14 may only be constrained by the tethers 18 that connect the top and bottom end caps 12, 14 to one another. In other implementations, neither one of the top or bottom end caps 12, 14 may be stationary or fixed in space, and movement of the top and bottom end caps 12, 14 may only be constrained by the tethers 18 that connect the top and bottom end caps 12, 14 to one another. In exemplary embodiments, the at least one elastic tether 18 is one of an elastic band, a spring, and an elastic core surrounded by an inelastic outer winding.

Figure 4:
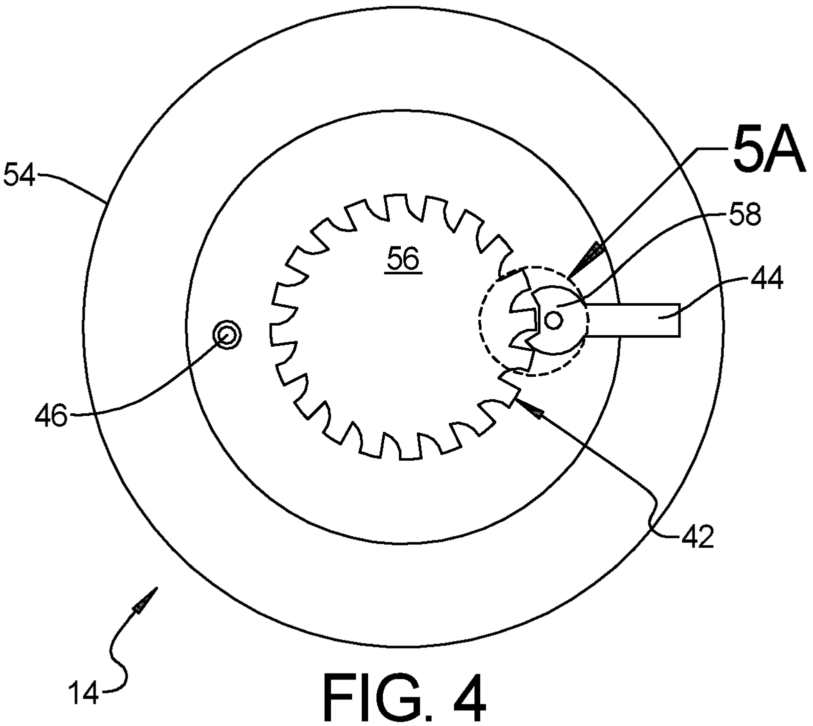
FIG. 4 is a view looking up onto a bottom surface of a bottom end cap.

Referring to FIG. 1 and FIG. 4, in an exemplary embodiment, the pulley assembly 32 includes an escapement mechanism 42. The escapement mechanism 42 is adapted to prevent rotation of the pulley assembly 32, and prevent the plurality of tethers 18A, 18B, 18C, 18D from un-winding from the pulley assembly 32. The escapement mechanism 42 includes a release lever 44 that is adapted to allow selective incremental release of the pulley assembly 32, thereby allowing the pulley assembly 32 to un-wind and release a measured length of each of the plurality of tethers 18A, 18B, 18C, 18D.

For example, in an exemplary embodiment, the escapement mechanism 42 is adapted to allow one inch of each tether 18A, 18B, 18C, 18D to un-wind from the pulley assembly 32 each time the escapement mechanism 42 is actuated by a user of the inflatable structure 10. Starting with the inflatable structure 10 partially inflated to an intermediary support profile 261, where the intermediary height 38 of the inflatable structure is twelve inches, if a user wishes to increase the height of the inflatable structure 10, actuation of the escapement mechanism 42 by the user releases the pulley assembly 32 and the pulley assembly 32 allows an additional one inch of each of the tethers 18A, 18B, 18C, 18D to un-wind, thus allowing the top end cap 12 to move an additional one inch upward, away from the bottom end cap 14. The bottom end cap 14 of the inflatable structure 10 includes an air inlet 46 adapted to allow pressurized air to be routed into the bladder 16 of the inflatable structure 10. Additional air is fed into the bladder 16 through the air inlet 46, and the pressure again builds up within the bladder 16, resulting in the inflatable structure 10 providing an intermediary support profile 261 that has an intermediary height 38 of thirteen inches and is capable of supporting a compressive load thereon. Each successive actuation of the escapement mechanism 42 results in an intermediary support profile 261 that is one inch higher than the previous intermediary support profile.

In an exemplary embodiment, the bottom end cap 14 includes an upper surface 48 onto which the bladder 16 is attached, and a bottom surface 50, the pulley assembly 32 being positioned adjacent the upper surface 48, as shown in FIG. 3, and the escapement mechanism 42 being positioned adjacent the bottom surface 50, as shown in FIG. 4.

Referring again to FIG. 3, in another exemplary embodiment, the bottom end cap 14 includes a plurality of loops 52A, 52B, 52C, 52D extending from the upper surface 48 of the bottom end cap 14 and equally spaced circumferentially around the bottom end cap 14 adjacent an outer perimeter 54 of the bottom end cap 14. Each of the plurality of tethers 18A, 18B, 18C, 18D is adapted to extend from the pulley assembly 32 and through one of the plurality of loops 52A, 52B, 52C, 52D and upward to the top end cap 12. As shown, the first tether 18A extends from the pulley assembly 32, radially outward to a first loop 52A, through the first loop 52A, and upward to the top end cap 12, the second tether 18B extends from the pulley assembly 32, radially outward to a second loop 52B, through the second loop 52B, and upward to the top end cap 12, the third tether 18C extends from the pulley assembly 32, radially outward to a third loop 52C, through the third loop 52C and upward to the top end cap 12, and the fourth tether 18D extends from the pulley assembly 32, radially outward to a fourth loop 52D, through the fourth loop 52D and upward to the top end cap 12.

Referring again to FIG. 4, in an exemplary embodiment, the escapement mechanism 42 includes a gear 56 including a plurality of gear teeth mounted in rotational engagement with the pulley assembly 32 and adapted to rotate with the pulley assembly 32. The release lever 44 includes an anchor portion 58 pivotally mounted to the bottom end cap 14 adjacent the gear 56. The anchor portion 58 of the release lever 44 engages the plurality of teeth and prevents rotation of the gear 56 and the pulley assembly 32 and un-winding of the plurality of tethers 18A, 18B, 18C, 18D. The anchor portion 58 of the escapement mechanism 42 is adapted to be selectively actuated, wherein each actuation of the anchor portion 58 of the release lever 44 allows the gear 56 to rotate one tooth which allows a measured length of each of the plurality of tethers 18A, 18B, 18C, 18D to unwind from the pulley assembly 32.

Figure 5A:
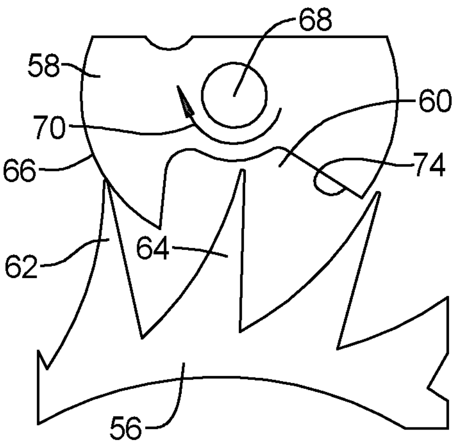
FIG. 5A is an enlarged view of a portion of an escapement mechanism indicated by "FIG. 5A" in FIG. 4.
Figure 5B:
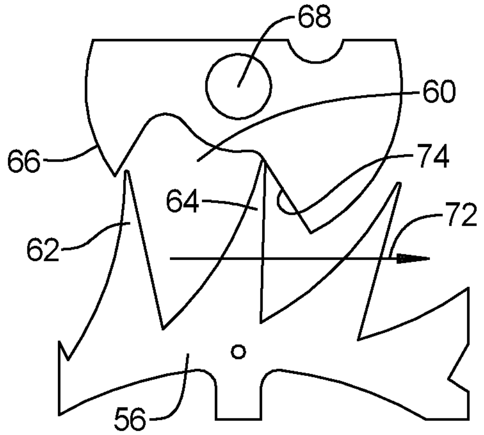
FIG. 5B is an enlarged view similar to FIG. 5A, wherein an anchor portion of the escapement mechanism has been actuated.
Figure 5C:
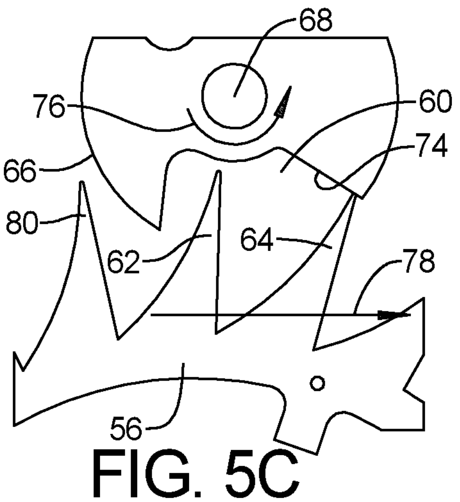
FIG. 5C is an enlarged view similar to FIG. 5A, wherein the anchor portion of the escapement mechanism is moving back to a default position and a gear is rotating.
Figure 5D:
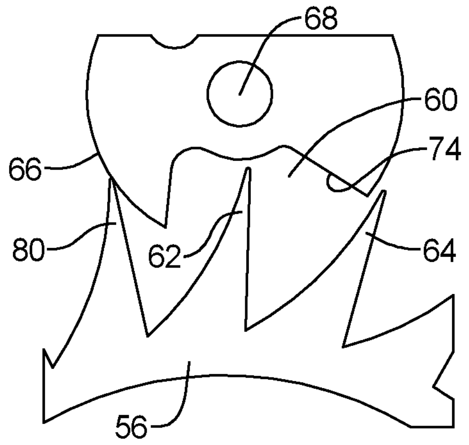
FIG. 5D is an enlarged view similar to FIG. 5A, wherein the anchor portion of the escapement mechanism is in the default position, and the gear has been rotated by one tooth.

Referring to FIG. 5A, the anchor portion 58 of the escapement mechanism 42 is shown in a default position where the anchor portion 58 of release lever 44 prevents rotation of the gear 56. In an exemplary embodiment, the release lever 44 is biased to the default position, wherein upon actuation by a user, the release lever 44 automatically returns to the default position when released. The anchor portion 58 of the release lever 44 includes a notch 60. A first tooth 62 of the gear 56 is positioned within the notch 60, and a second tooth 64 of the gear 56 contacts an outer surface 66 of the anchor portion 58, wherein rotation of the gear 56 is prevented. The anchor portion 58 is actuated by rotation about a pivot point 68, as indicated by arrow 70. Referring to FIG. 5B, when the anchor portion 58 rotates as indicated by arrow 70, the gear 56 rotates, as indicated by arrow 72, the first tooth 62 of the gear 56 contacts a side wall 74 of the notch 60, and the second tooth 64 clears the outer surface 66 and enters the notch 60. Referring to FIG. 5C, after actuation, the anchor portion 58 is biased back to the default position, as shown by arrow 76, and the gear 56 is allowed to rotate, as indicated by arrow 78. Rotation of the gear 56 brings a third tooth 80 of the gear 56 into contact with the outer surface 66 of the anchor portion 58 of the release lever 44, and further rotation of the gear 56 is prevented. Referring to FIG. 5D, once the anchor portion 58 of the release mechanism 42 returns to the default position, the third tooth 80 rests in contact with the outer surface 66, the second tooth 64 is positioned within the notch 60, and the first tooth 62 is positioned outside the notch 60. Thus, upon each actuation of the release mechanism 42, the gear 56 is allowed to rotate one tooth, allowing the pulley assembly 32 to rotate along with the gear 56, and allowing a measured amount of each of the tethers 18A, 18B, 18C, 18D to un-wind from the pulley assembly 32.

The operation of the escapement mechanism 42 depends on tension applied to the tethers 18A, 18B, 18C, 18D. When the bladder 16 of the inflatable structure 10 is inflated to an intermediary support profile 261, the pressure within the bladder 16 pulls the tethers 18A, 18B, 18C, 18D tight, and pulls on the pulley assembly 32. This tension in the tethers 18A, 18B, 18C, 18D biases the pulley assembly 32 and the gear 56 to rotate as indicated by arrows 72 and 78 in FIG. 5B and FIG. 5C.

Figure 6A:
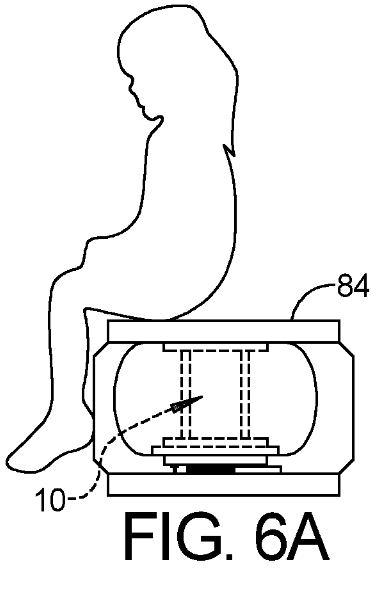
FIG. 6A is a perspective view of an inflatable structure in an intermediary support profile being used as a seating surface.
Figure 6B:
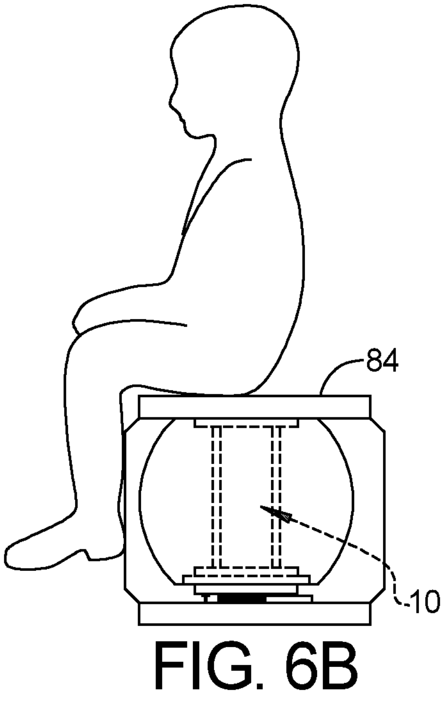
FIG. 6B is a perspective view of the inflatable structure in FIG. 6A, wherein the inflatable device is in a final support profile.
Figure 7:
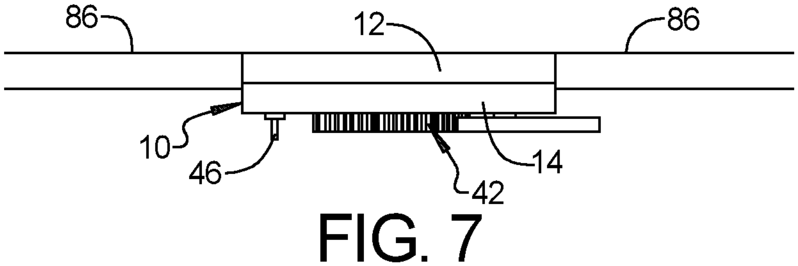
FIG. 7 is a perspective view of an inflatable structure in the stowed support profile mounted flush within a floor of a vehicle.

Referring again to FIG. 3 and FIG. 4, in one exemplary embodiment, the pulley assembly 32 includes a single pulley 82, and each of the plurality of tethers 18A, 18B, 18C, 18D are adapted to wind up onto the single pulley 82. Each actuation of the anchor portion 58 of the release lever 44 allows an equal length of each of the plurality of tethers 18A, 18B, 18C, 18D to unwind from the pulley 82 simultaneously. Because each of the tethers 18A, 18B, 18C, 18D are allowed to lengthen simultaneously and equally, the orientation of the top end cap 12 does not change as the top end cap 12 moves away from the bottom end cap 14, and the top end cap 12 remains substantially level. Thus, when the inflatable structure 10 is changed from the intermediary support profile 261, as shown in FIG. 6A, to the final support profile 26F, as shown in FIG. 6B, a support surface 84 provided by the top end cap 12 remains level. The support surface 84 of the top end cap 12 will remain level at all intermediary support profiles 261 between the stowed support profile 26S and the final support profile 26F. The top end cap 12 may be utilized for a seating surface within a vehicle or for a table surface. For example, referring again to FIG. 2B, the inflatable structure 10 may be inflated to an intermediary support profile 261, where the height 38 of the top end cap 12 is appropriate for use as a seating surface within the vehicle, as shown in FIG. 6A and FIG. 6B. Alternatively, referring again to FIG. 2C, the inflatable structure 10 may be inflated to a final support structure 26F, where the height 40 of the top end cap 12 is appropriate for use as a table. Referring to FIG. 7, in an exemplary embodiment, when the inflatable structure 10 is in the stowed support profile 26S, the inflatable structure 10 is recessed within a floor 86 of a vehicle, wherein the support surface 84 of the top end cap 14 is flush with the floor 86 of the vehicle. Thus, when in the stowed position, as shown in FIG. 7, the inflatable structure 10 does not interfere with use of the vehicle floor 86 for carrying cargo. As well as being used for a seating surface or table surface, the inflatable structure 10 may be inflated to an intermediary support profile 261 or the final support profile 26F to act as a constraint to prevent cargo from sliding on the vehicle floor.

In another exemplary embodiment, the pulley assembly 32 includes at least two pulleys, at least one of the plurality of tethers 18A, 18B, 18C, 18D adapted to wind onto each of the at least two pulleys, wherein each of the at least two pulleys is adapted to allow selective incremental release of a different measured length of the at least one of the plurality of tethers 18A, 18B, 18C, 18D wound thereon upon each actuation of the release lever 44.

Figure 8:
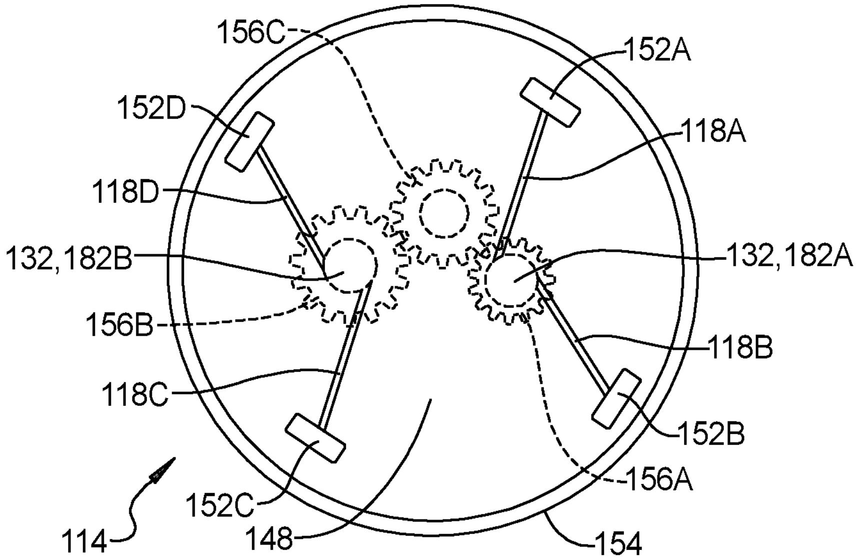
FIG. 8 is a view looking down onto an upper surface of a bottom end cap having a pulley assembly including a first pulley and a second pulley.

Referring to FIG. 8, an inflatable structure 110 includes a bottom end cap 114 having a pulley assembly 132 including a first pulley 182A and a second pulley 182B. A first tether 118A and a second tether 118B are adapted to wind onto the first pulley 182A and a third tether 118C and a fourth tether 118D are adapted to wind onto the second pulley 182B.

Figure 9:
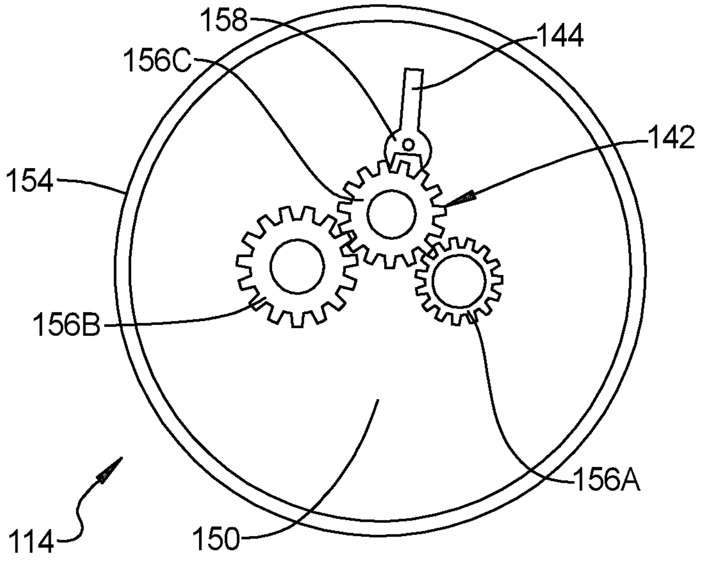
FIG. 9 is a view looking up onto a bottom surface of a bottom end cap having an escapement mechanism with a gear set including a first gear, a second gear and a third gear.

The bottom end cap 114 includes an upper surface 148 onto which the bladder 16 is attached, and a bottom surface 150, the pulley assembly 132 being positioned adjacent the upper surface 148, as shown in FIG. 8, and an escapement mechanism 142 being positioned adjacent the bottom surface 150, as shown in FIG. 9. The escapement mechanism 142 including a gear set 156 including a first gear 156A, a second gear 156B and a third gear 156C. Each of the first, second and third gears 156A, 156B, 156C include a plurality of gear teeth. The first pulley 182A is rotatably attached to the first gear 156A for rotation with the first gear 156A, the second pulley 1826 is rotatably attached to the second gear 1566 for rotation with the second gear 156B, and the third gear 156C is engaged with and interconnects the first and second gears 156A, 156B.

Referring again to FIG. 8, the bottom end cap 114 includes a plurality of loops 152A, 152B, 152C, 152D extending from the upper surface 148 of the bottom end cap 114 and equally spaced circumferentially around the bottom end cap 114 adjacent an outer perimeter 154 of the bottom end cap 114. Each of the plurality of tethers 118A, 118B, 118C, 118D is adapted to extend from the pulley assembly 132 and through one of the plurality of loops 152A, 152B, 152C, 152D and upward to the top end cap 112. As shown, the first tether 118A extends from the first pulley 182A, radially outward to a first loop 152A, through the first loop 152A, and upward to the top end cap, the second tether 1186 extends from the first pulley 182A, radially outward to a second loop 152B, through the second loop 152B, and upward to the top end cap, the third tether 118C extends from the second pulley 182B, radially outward to a third loop 152C, through the third loop 152C and upward to the top end cap, and the fourth tether 118D extends from the second pulley 182B, radially outward to a fourth loop 152D, through the fourth loop 152D and upward to the top end cap.

Referring again to FIG. 9, the escapement mechanism 142 includes a release lever 144 with an anchor portion 158 pivotally mounted to the bottom end cap 114 adjacent to and engaging the third gear 156C to prevent rotation of the first, second and third gears 156A, 1566, 156C and the first and second pulleys 182A, 182B and un-winding of the plurality of tethers 118A, 118B, 118C, 118D from the first and second pulleys 182A, 182B. The release lever 144 is adapted to be selectively actuated, wherein each actuation of the anchor portion 158 of the release lever 144 allows the first, second and third gears 156A, 156B, 156C to rotate one gear tooth which allows a different measured length of the at least one of the plurality of tethers 118A, 1186, 118C, 118D wound thereon to unwind from each of the first and second pulleys 182A, 182B.

Figure 10:
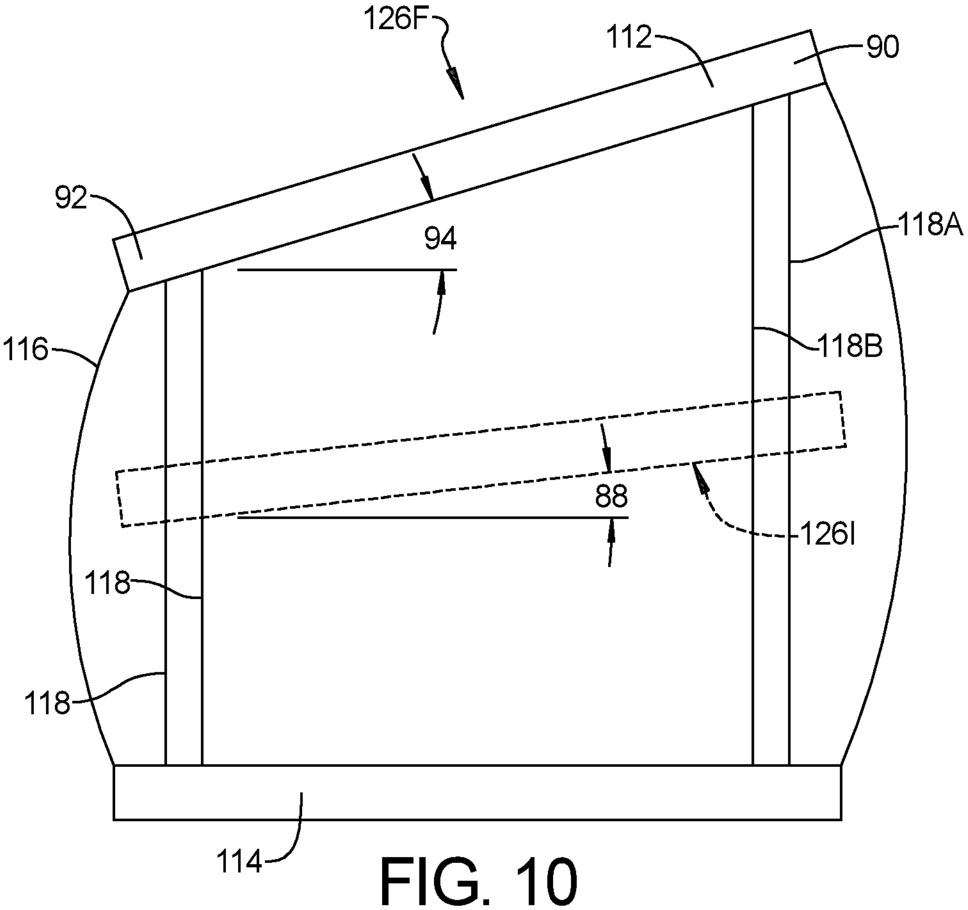
FIG. 10 is a perspective schematic view of an inflatable structure providing angled support profiles.

In an exemplary embodiment, the first gear 156A includes a first number of gear teeth, and the second gear 156B includes a second number of gear teeth greater than the first number of gear teeth. Thus, when the release mechanism 142 allows rotation of the first, second and third gears 156A, 1566, 156C by one tooth, the second gear 1566 rotates less than the first gear 156A and the second pulley 1826 releases a measured amount of the third and fourth tethers 118C, 118D that is less than a measured amount of the first and second tethers 118A, 1186 that is released by the first pulley 182A. Therefore, when the inflatable structure 10 is partially inflated from the stowed support profile 26S, as shown in FIG. 2A and FIG. 7, to an intermediary support profile 1261, as shown in shadow in FIG. 10, the orientation of the top end cap 112 is angled at a first angle 88 relative to the bottom end cap 114. The angled orientation is caused because more of each of the first and second tethers 118A, 1186 is allowed to un-wind from the first pulley 182A than each of the third and fourth tethers 118C, 118D from the second pulley 1826 each time the escapement mechanism 142 is actuated, thus allowing a first side 90 of the top end cap 112 that is attached to the first and second tethers 118A, 1186 to move further away from the bottom end cap 114 than a second side 92 of the top end cap 112 that is attached to the third and fourth tethers 118C, 118D.

Correspondingly, when a user selectively actuates the escapement mechanism 142 to move the inflatable structure 10 from the intermediary support profile 1261 to a final support profile 126F, the orientation of the top end cap 112 is angled further, at a second angle 94 relative to the bottom end cap 114. The angle of orientation is caused because more of each of the first and second tethers 118A, 118B is allowed to un-wind from the first pulley 182A than each of the third and fourth tethers 118C, 118D from the second pulley 1826, thus allowing the first side 90 of the top end cap 112 that is attached to the first and second tethers 118A, 1186 to move further away from the bottom end cap 114 than the second side 92 of the top end cap 112 that is attached to the third and fourth tethers 118C, 118D. The angle of the top end cap 112 increases linearly from zero degrees when the inflatable structure 10 is in the stowed support profile 26S to the second angle 94 when the inflatable structure 10 is in the final support profile 126F.

An inflatable structure of the present disclosure offers several advantages. These include providing an inflatable structure that is capable of supporting compressive loads not only when the inflatable structure is fully inflated and presents a final support profile, but also when the inflatable structure is partially inflated and presents one of a plurality of intermediary support profiles. Further, the orientation of a top end cap can be tailored for specific uses, such as deployment of aerodynamic features, mirrors, or other external features of an automobile, as well as providing support structures for passengers or objects to be utilized by a passenger within an automobile.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An inflatable structure comprising:

a top end cap;

a bottom end cap;

a bladder attached to the top and bottom end caps and configured to hold pressurized air between the top and bottom end caps;

a plurality of tethers disposed within the bladder, each tether in the plurality of tethers having a first end coupled to the top end cap and a second end coupled to the bottom end cap;

the inflatable structure moveable between a stowed profile, wherein no pressure is present within the bladder and the top end cap and bottom end cap are positioned in contact and the bladder is compressed within the top end cap and the bottom end cap, and a final support profile, wherein the bladder is pressurized and expanded axially and the top end cap and the bottom end cap are forced apart and the plurality of tethers are fully extended and restrict further movement of the top end cap and the bottom end cap away from one another and limit axial expansion of the bladder;

a pulley assembly mounted within the bottom end cap, wherein when the inflatable structure is in the stowed support profile, the plurality of tethers are wound onto the pulley assembly, the pulley assembly adapted to allow selective extension of the plurality of tethers to increase the distance that the top end cap can move away from the bottom end cap and allowing axial expansion of the bladder;

wherein, the inflatable structure is adapted to provide multiple intermediary support profiles between the stowed profile and the final support profile that are capable of supporting compressive loading.

2. The inflatable structure of claim 1, wherein the pulley assembly is adapted to secure the plurality of tethers at each intermediary support profile and limit further extension of the plurality of tethers.

3. The inflatable structure of claim 2, wherein the pulley assembly includes an escapement mechanism adapted to prevent rotation of the pulley assembly, and preventing the plurality of tethers from un-winding from the pulley assembly.

4. The inflatable structure of claim 3, wherein the escapement mechanism includes a release lever that is adapted to allow selective incremental release of the pulley assembly, thereby allowing the pulley assembly to un-wind and release a measured length of each of the plurality of tethers.

5. The inflatable structure of claim 4, wherein the bottom end cap includes an upper surface onto which the bladder is attached, and a bottom surface, the pulley assembly being positioned adjacent the upper surface and the escapement mechanism being positioned adjacent the bottom surface.

6. The inflatable structure of claim 5, wherein the bottom end cap includes a plurality of loops extending from the upper surface of the bottom end cap and equally spaced circumferentially around the bottom end cap adjacent an outer perimeter of the bottom end cap, each of the plurality of tethers adapted to extend from the pulley assembly and through one of the plurality of loops and upward to the top end cap.

7. The inflatable structure of claim 6, wherein the bottom end cap includes an air inlet adapted to allow pressurized air to be routed into the inflatable structure.

8. The inflatable structure of claim 7, wherein the escapement mechanism includes a gear including a plurality of gear teeth mounted in rotational engagement with the pulley assembly and adapted to rotate with the pulley assembly, and the release lever includes an anchor portion pivotally mounted to the bottom end cap adjacent the gear, the anchor portion of the release lever adapted to engage the plurality of teeth and prevent rotation of the gear and pulley assembly and un-winding of the plurality of tethers and adapted to be selectively actuated, wherein each actuation of the anchor portion of the release lever allows the gear to rotate one tooth which allows a measured length of each of the plurality of tethers to unwind from the pulley assembly.

9. The inflatable structure of claim 8, wherein the pulley assembly includes a single pulley, each of the plurality of tethers adapted to wind up onto the single pulley, wherein each actuation of the anchor portion of the release lever allows an equal length of each of the plurality of tethers to unwind from the pulley.

10. The inflatable structure of claim 7, wherein the pulley assembly includes at least two pulleys, at least one of the plurality of tethers adapted to wind onto each of the at least two pulleys, wherein each of the at least two pulleys is adapted to allow selective incremental release of a different measured length of the at least one of the plurality of tethers wound thereon upon each actuation of the release lever.

11. The inflatable structure of claim 7, wherein the pulley assembly includes a first pulley and a second pulley, at least one of the plurality of tethers adapted to wind onto each of the at least two pulleys, and the escapement mechanism includes a gear set including a first gear, a second gear and a third gear, each of the first, second and third gears having a plurality of gear teeth, the first pulley rotatably attached to the first gear, the second pulley rotatably attached to the second gear, and the third gear engaged with and interconnecting the first and second gears;

wherein, the release lever includes an anchor portion pivotally mounted to the bottom end cap adjacent to and engaging the third gear to prevent rotation of the first, second and third gears and the first and second pulleys and un-winding of the plurality of tethers from the first and second pulleys and adapted to be selectively actuated, wherein each actuation of the anchor portion of the release lever allows the first, second and third gears to rotate one gear tooth which allows a different measured length of the at least one of the plurality of tethers wound thereon to unwind from each of the first and second pulleys.

12. The inflatable structure of claim 11, wherein the first gear includes a first number of gear teeth, and the second gear includes a second number of gear teeth greater than the first number of gear teeth.

13. The inflatable structure of claim 7, wherein the inflatable structure is mounted within an automotive vehicle and when in the stowed position, the inflatable structure is recessed flush with a floor of the vehicle and is adapted to provide one of a seating surface, a table and a cargo constraint when in the final support profile and any one of the plurality of intermediary support profiles.

14. An inflatable structure for an automotive vehicle comprising:

a top end cap;

a bottom end cap;

a bladder attached to the top and bottom end caps and configured to hold pressurized air between the top and bottom end caps;

a first tether, a second tether, a third tether and a fourth tether disposed within the bladder, the first, second, third and fourth tethers each having a first end coupled to the top end cap and a second end coupled to the bottom end cap;

the inflatable structure moveable between a stowed profile, wherein no pressure is present within the bladder and the top end cap and bottom end cap are positioned in contact and the bladder is compressed within the top end cap and the bottom end cap, and a final support profile, wherein the bladder is pressurized and expanded axially and the top end cap and the bottom end cap are forced apart and the first, second, third and fourth tethers are fully extended and restrict further movement of the top end cap and the bottom end cap away from one another and limit axial expansion of the bladder;

a pulley assembly mounted within the bottom end cap, wherein when the inflatable structure is in the stowed profile, each of the first, second, third and fourth tethers are wound onto the pulley assembly, the pulley assembly adapted to allow selective extension of each of the first, second, third and fourth tethers to increase the distance that the top end cap can move away from the bottom end cap and allowing axial expansion of the bladder;

wherein, the inflatable structure is adapted to provide multiple intermediary support profiles between the stowed profile and the final support profile that are capable of supporting compressive loading, and when in the stowed position, the inflatable structure is recessed flush with a floor of the vehicle and is adapted to provide one of a seating surface, a table and a cargo constraint when in the final support profile and any one of the plurality of intermediary support profiles.

15. The inflatable structure of claim 14, wherein the pulley assembly includes an escapement mechanism adapted to prevent rotation of the pulley assembly and prevent the plurality of tethers from un-winding from the pulley assembly to secure the plurality of tethers and limit further extension of the plurality of tethers at each intermediary support profile, the escapement mechanism including a release lever that is adapted to allow selective incremental release of the pulley assembly, thereby allowing the pulley assembly to un-wind and release a measured length of each of the plurality of tethers.

16. The inflatable structure of claim 15, wherein the bottom end cap includes:

an upper surface onto which the bladder is attached, and a bottom surface, the pulley assembly being positioned adjacent the upper surface and the escapement mechanism being positioned adjacent the bottom surface;

an air inlet adapted to allow pressurized air to be routed into the inflatable structure; and four loops extending from the upper surface of the bottom end cap and equally spaced circumferentially around the bottom end cap adjacent an outer perimeter of the bottom end cap, each of the first, second, third and fourth tethers extending from the pulley assembly and individually through one of the four loops and upward to the top end cap.

17. The inflatable structure of claim 16, wherein the escapement mechanism includes a gear including a plurality of gear teeth mounted in rotational engagement with the pulley assembly and adapted to rotate with the pulley assembly, and the release lever includes an anchor portion pivotally mounted to the bottom end cap adjacent the gear, the anchor portion of the release lever adapted to engage the plurality of teeth and prevent rotation of the gear and pulley assembly and un-winding of the plurality of tethers and adapted to be selectively actuated, wherein each actuation of the anchor portion of the release lever allows the gear to rotate one tooth which allows a measured length of each of the plurality of tethers to unwind from the pulley assembly.

18. The inflatable structure of claim 17, wherein the pulley assembly includes a single pulley, each of the plurality of tethers adapted to wind up onto the single pulley, wherein each actuation of the anchor portion of the release lever allows an equal length of each of the plurality of tethers to unwind from the pulley.

19. The inflatable structure of claim 16, wherein the pulley assembly includes a first pulley and a second pulley, at least one of the plurality of tethers adapted to wind onto each of the at least two pulleys, and the escapement mechanism includes a gear set including a first gear, a second gear and a third gear, each of the first, second and third gears having a plurality of gear teeth, the first pulley rotatably attached to the first gear, the second pulley rotatably attached to the second gear, and the third gear engaged with and interconnecting the first and second gears;

wherein, the release lever includes an anchor portion pivotally mounted to the bottom end cap adjacent to and engaging the third gear to prevent rotation of the first, second and third gears and the first and second pulleys and un-winding of the plurality of tethers from the first and second pulleys and adapted to be selectively actuated, wherein each actuation of the anchor portion of the release lever allows the first, second and third gears to rotate one gear tooth which allows a different measured length of the at least one of the plurality of tethers wound thereon to unwind from each of the first and second pulleys.

20. The inflatable structure of claim 19, wherein the first gear includes a first number of gear teeth, and the second gear includes a second number of gear teeth greater than the first number of gear teeth.

* * * * *